United States Patent

Kacere

[11] 3,905,323
[45] Sept. 16, 1975

[54] AMPHIBIOUS VEHICLE
[75] Inventor: Joseph A. Kacere, St. Clairsville, Ohio
[73] Assignee: The Raymond Lee Organization, Inc., New York, N.Y. ; a part interest.
[22] Filed: Oct. 29, 1974
[21] Appl. No.: 518,281

[52] U.S. Cl. .................................. 115/1 R; 115/20
[51] Int. Cl.² ............................................ B63H 1/38
[58] Field of Search ........ 115/1 R, 20, 19; 280/205, 280/206, 207, 208; 180/10, 21, 79.2 B, 30, 31, 42, 52

[56] References Cited
UNITED STATES PATENTS

| | | | |
|---|---|---|---|
| 2,267,254 | 12/1941 | Reilley | 115/20 |
| 3,327,801 | 6/1967 | Ezra | 115/20 X |
| 3,566,986 | 3/1971 | Udden | 180/52 |
| 3,606,856 | 9/1971 | Moraga | 115/19 |

Primary Examiner—Trygve M. Blix
Assistant Examiner—Gregory W. O'Connor
Attorney, Agent, or Firm—Daniel Jay Tick

[57] ABSTRACT

An amphibious vehicle comprises a frame having two sections pivotally affixed to each other for rotation about a vertical pivotal axis. A first hollow sphere is rotatably mounted in one section of the frame for rotation about a first horizontal axis. A second hollow sphere is mounted in the other section of the frame on a second horizontal axis. A third hollow sphere is rotatably mounted around the second sphere for rotation about the second horizontal axis. A power source in the first sphere rotates the first sphere about the first axis. A control system in the second sphere is coupled to the power source of the first sphere for controlling the power source and pivotal movement of the second and third spheres relative to the first sphere for steering the vehicle.

5 Claims, 5 Drawing Figures

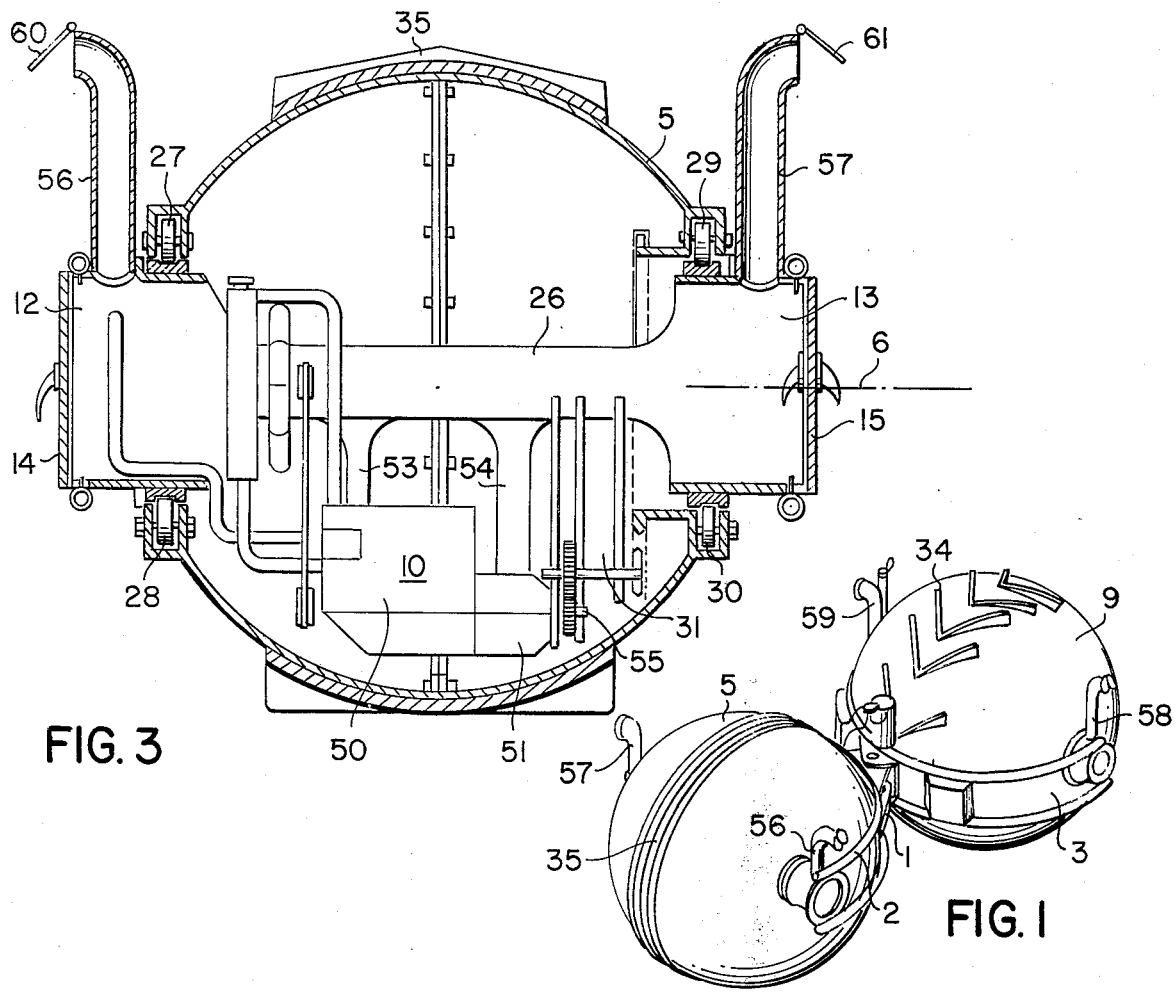
FIG. 3
FIG. 1
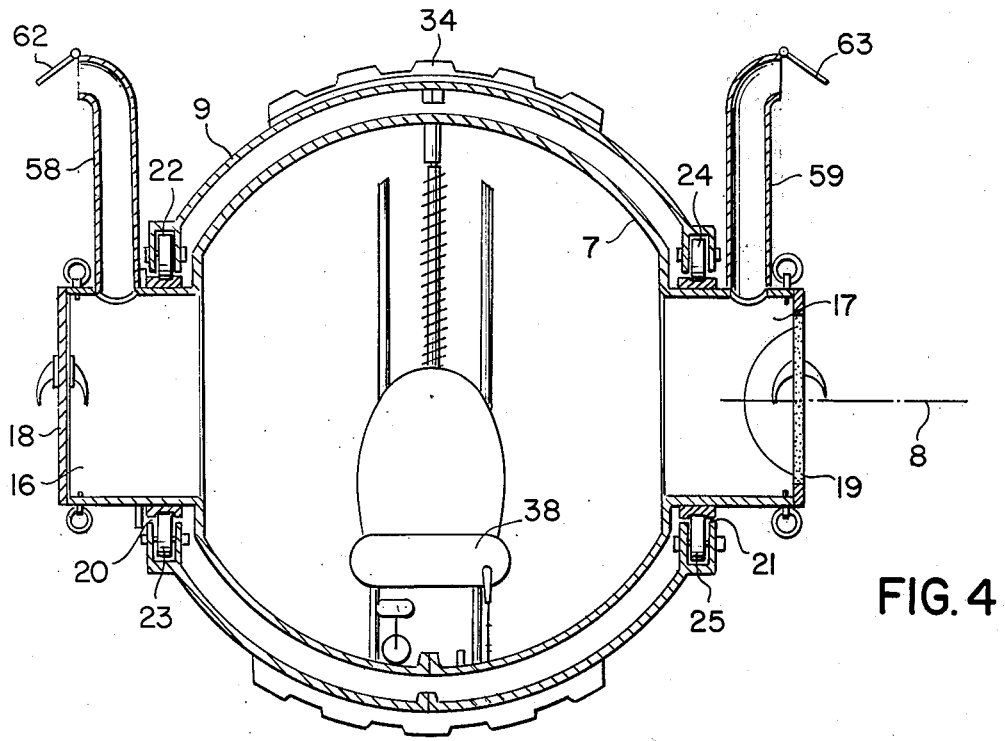
FIG. 4

AMPHIBIOUS VEHICLE

DESCRIPTION OF THE INVENTION

The present invention relates to an amphibious vehicle.

Objects of the invention are to provide an amphibious vehicle which overcomes the disadvantages of a single sphere vehicle by separating the passenger's compartment from the power source thereby avoiding exposure to engine fumes, heat and noise, greater stability and control response than single spheres without the need for external stabilizers required by single spheres, closer response to braking and steering, preventing tumbling and spinning of passengers, as occurs inside a single sphere on an uphill grade, prevention of tumbling back downhill on an uphill grade, as occurs with a single sphere, safety from severe injury due to shifting of the power plant in an accident, as occurs in a single sphere, enhanced buoyancy, greater payload, and efficiency, effectiveness and reliability in operations on every type of terrain, including snow, mud, sand, in water, on the bed of a body of water, on land, and on the surface of the moon.

In order that the invention may be readily carried into effect, it will now be described with reference to the accompanying drawing, wherein:

FIG. 1 is a perspective view of an embodiment of the amphibious vehicle of the invention;

FIG. 3 is a view, in a vertical plane, partly in section, of the first sphere;

FIG. 4 is a view, in a vertical plane, partly in section, of the second and third spheres.

Figure 2:
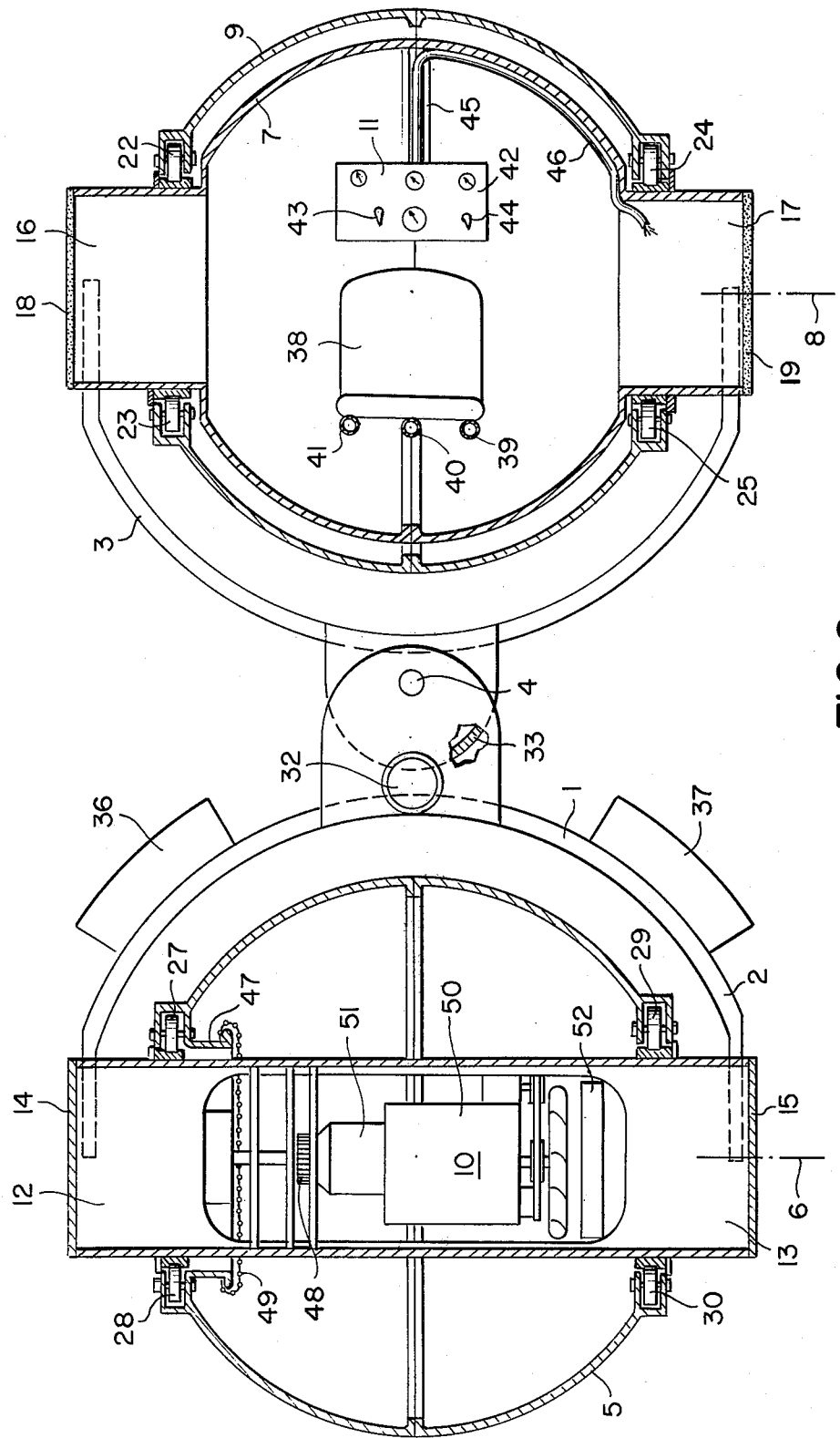
FIG. 2 is a cross-sectional view, in a horizontal plane, of the embodiment of FIG. 1.

The amphibious vehicle of the invention operates operation on land, in water, snow, rough terrain, turbulent flood waters, or rough seas. The vehicle consists of two hollow spheres in tandem. The front sphere is the pilot and passenger, or cargo sphere, and the rear or trailing sphere is the drive sphere. The drive sphere can be powered by any suitable gasoline or diesel engine, or by a battery powered electric motor. The axle of the drive sphere is longer than the diameter of the sphere and is rigidly affixed to the external frame of the vehicle. The engine is suspended on the drive sphere axle as low as possible to gravity stabilize the vehicle. The rear axle also serves as a frame for the hatch doors. The front and rear axles are of suitable diameter for easy entry into the front and rear spheres. The location of hatches on any other parts of the spheres, except at the poles, is impracticle due to water leaks, jammed hatches in case the spheres roll on the hatches and problems of balance. The drive sphere is rotated by a chain drive from the engine to a sprocket rigidly affixed to the drive sphere via an automatic transmission.

The pilot and passenger or cargo sphere consists of two spheres, an external rotating sphere and an inner stationary sphere. The inner sphere is part of the front axle, which functions as hatch ways and the pilot's cabin, and in larger versions, as the cargo and passenger compartment. The front inner sphere axle is fixed rigidly to the external frame of the vehicle. The outer sphere of the pilot's or front sphere rotates on rollers or other anti-friction bearings on the inner sphere axle.

This vehicle also consists of ventilating snorkels and shutters for operation in rough waters. Steering is accomplished by making the external frame in two units joined by a pivot pin between the pilot sphere and drive sphere. The steering of the vehicle can be accomplished by a reversible electric motor or by hydraulic cylinders mounted on the front and rear frames. If desired, the vehicle may be steered manually via a cable hook up and a manually operated steering wheel.

In a single sphere vehicle, it is impractical and dangerous to ride in the same compartment with the engine. The pilot should be separated from engine fumes and heat and noise. Single spheres are also difficult to control without external stabilizers. Down hill, if a sudden stop is necessary, a single sphere vehicle continues to tumble as a unit when the brakes are applied. Up hill, the pendulum and operator will tumble and spin inside a single sphere vehicle when the grade is such that the force required to move the single sphere up hill is greater than the weight of the pendulum. In this case single sphere vehicles tend to tumble back down the hill.

By combining two spheres in tandem, in the vehicle of the invention, many difficult problems and impractical aspects of the single sphered vehicles have been eliminated. In the vehicle of the invention, the pilot is almost completely free from engine fumes, noise and heat, not to mention other hazards of riding in the same sphere with the engine. The forward pilot sphere is a roomy compartment with only a control panel and a few levers and brake pedal. The buoyancy of the vehicle of the invention is doubled, the payload is greater and the vehicle is 95% more stable than known vehicles.

The vehicle is an excellent rescue craft in floods, since it can operate through mud, swamps and shallow waters and roll over underbrush. It operates waters full of icebergs. It is a handy vehicle for the Artic regions. It crosses rivers with ease. The vehicle of the invention is designed primarily as a rescue craft and exploratory vehicle and may explore the moon with facility.

Figure 5:
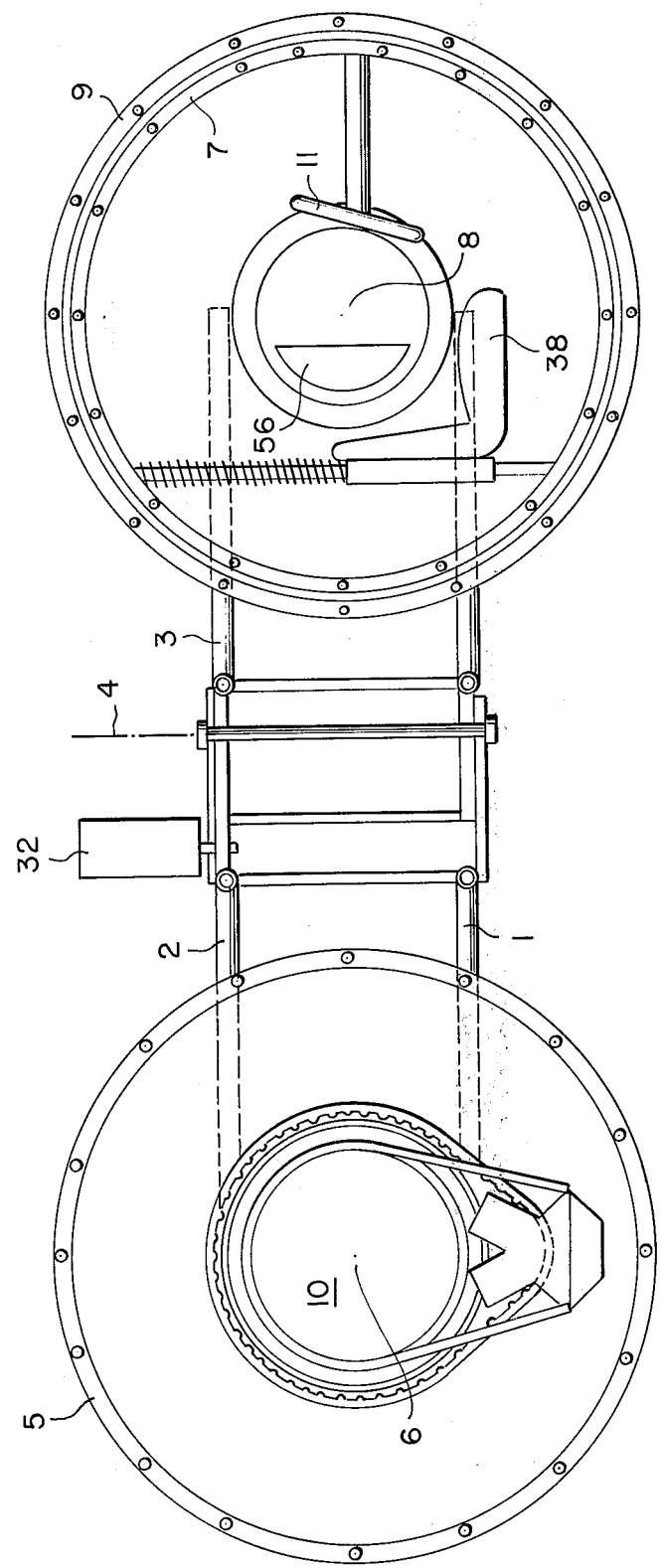
FIG. 5 is a view, in a vertical plane through the first and second and third spheres, partly in section, of the embodiment of FIG. 1.

The amphibious vehicle of the invention comprises a frame 1 (FIGS. 1, 2 and 5) having two sections 2 and 3 pivotally affixed to each other for rotation about a substantially vertical pivotal axis 4 (FIGS. 2 and 5).

A first hollow sphere 5 (FIGS. 1, 2, 3 and 5) is rotatably mounted in the section 2 of the frame 1 for rotation about a first substantially horizontal axis 6 (FIGS. 2, 3 and 5).

A second hollow sphere 7 is mounted in the section 3 of the frame 1 (FIGS. 2, 4 and 5) on a second substantially horizontal axis 8 (FIGS. 2, 4 and 5).

A third hollow sphere 9 (FIGS. 1, 2, 4 and 5) is rotatably mounted around the second sphere 7 for rotation about the second horizontal axis 8 (FIGS. 2, 4 and 5).

A power unit 10 (FIGS. 2, 3 and 5) is provided in the first sphere 5 for rotating the first sphere about the first axis 6. A control system 11 (FIGS. 2 and 5) in the second sphere 7 is coupled to the power source 10 of the first sphere 5 for controlling the power source and pivotal movement of the second and third spheres 7 and 9 relative to the first sphere for steering the vehicle.

A first pair of hollow cylindrical compartments 12 and 13 (FIGS. 2 and 3) extend in opposite diametrical relation from, and open into, the first sphere 5 coaxially with the first axis 6. The first pair of hollow cylindrical compartments 12 and 13 provide access to the first sphere 5 via hatches 14 and 15, respectively (FIGS. 2 and 3). A second pair of hollow cylindrical compartments 16 and 17 (FIGS. 2 and 4) extend in opposite diametrical relation from, and open into, the second sphere 7 coaxially with the second axis 8 (FIGS. 2 and 4). The second pair of hollow cylindrical compartments 16 and 17 provide access to the second sphere 7 via hatches 18 and 19, respectively, (FIGS. 2 and 4).

A pair of opposite diametrical holes 20 and 21 (FIG. 4) are formed through the third sphere 9, and the second pair of hollow cylindrical compartments 16 and 17 pass through said holes. The third sphere 9 rotates about the second sphere 7 in a substantially vertical plane around the second axis 8 via a plurality of rollers 22, 23, 24 and 25 bearing on the second pair of hollow cylindrical compartments 16 and 17 (FIGS. 2 and 4).

The power source 10 includes an axle or shaft 26 (FIGS. 2 and 3) coaxial with the first axis 6 and rotatably mounted in the first sphere. More particularly, the first pair of hollow cylindrical compartments 12 and 13 extend through the first sphere 5 and support the power source 10 therein. The first sphere 5 is rotatably mounted on the first pair of hollow cylindrical compartments 12 and 13 via a plurality of rollers 27, 28, 29 and 30, and so on (FIGS. 2 and 3), bearing on the first pair of hollow compartments 12 and 13. The power source 10 is coupled to the first sphere 5 via a gear linkage 31 of any suitable type, shown in FIG. 3.

Steering is accomplished by a reversible electric motor 32 (FIGS. 2 and 5) having a spur gear for turning a steering gear 33 which is rigidly affixed to the section 3 of the frame 1. The third sphere 9 has a tire type tread 34 (FIGS. 1 and 4) diametrically affixed around it. A tire type rim 35 is also diametrically affixed around the first sphere 5 (FIGS. 1 and 3). External fuel tanks 36 and 37 are affixed to the section 2 of the frame 1 (FIG. 2).

The pilot or operator is seated in a seat 38 (FIGS. 2, 4 and 5) mounted on shock absorbers 39, 40 and 41 on slide bars (FIG. 2).

The control system 11 has a control panel 42 having a transmission shifting toggle 43 and a steering toggle 44, as shown in FIG. 2. A conduit 45 extends from the control panel and accommodates the control cable 46, which extends to the first sphere 5. The first, second and third spheres are assembled with greater facility by being constructed as hemispheres and then joined along abutting flanges, as shown in FIG. 3. A brake drum 47 is shown in FIG. 2 in the first sphere 5. A drive sprocket 48 is driven by a drive sprocket chain 49 in the first sphere 5, as shown in FIG. 2. The engine 50 (FIGS. 2 and 3) is preferably a V-type internal combusion engine and has a transmission 51 (FIGS. 2 and 3) and a radiator 52 (FIG. 2).

As shown in FIG. 3, the engine 50 is suspended as low as possible to gravity stabilize the vehicle and is rigidly affixed to the axle or shaft 26 of the first sphere 5 (FIG. 3), via engine mounting brackets 53 and 54. The engine has a drive shaft 55 (FIG. 3).

A mirror 56 is provided in the second sphere 7 to provide a view through the windows of the hatches.

The tire type treads are solid rubber and the solid rubber tread 34 has fins formed therein for travel in mud and water 12. The hatches of the front sphere have shatterproof windows and are waterproof and hinged to the front sphere axle. The hatches for entry to the front drive sphere are windowless and are hinged to the rear cylindrical axle. Ventilating snorkels 56, 57, 58 and 59 are provided with shutters 60, 61, 62 and 63 to enable diving into the water off of a river bank or beach and for rough seas and turbulent waters.

The third sphere 9 rotates around the second sphere 7 on eight or more rollers and the first sphere 5 rotates on 8 or more rollers. The rollers revolve on groove ring-rails. Four anti-friction bearings of suitable diameter may be used. Sealing rings prevent water leaks and grease leaks.

From the pilot's seat, the pilot may use a mirror to see in front of the vehicle. Left and right mirrors provide views through side windows. The left mirror is affixed to one hatch and the right mirror is affixed to another hatch. The mirrors swing out of the way when the hatches are opened.

While the invention has been described by means of a specific example and in a specific embodiment, I do not wish to be limited thereto, for obvious modifications will occur to those skilled in the art without departing from the spirit and scope of the invention.

I claim:
1. An amphibious vehicle, comprising
   a frame having two sections pivotally affixed to each other for rotation about a substantially vertical pivotal axis;
   a first hollow sphere rotatably mounted in one section of the frame for rotation about a first substantially horizontal axis;
   a second hollow sphere mounted in the other section of the frame on a second substantially horizontal axis;
   a third hollow sphere rotatably mounted around the second sphere for rotation about the second horizontal axis;
   power means in the first sphere for rotating the first sphere about the first axis; and
   control means in the second sphere coupled to the power means of the first sphere for controlling the power means and pivotal movement of the second and third spheres relative to the first sphere for steering the vehicle.

2. An amphibious vehicle as claimed in claim 1, further comprising a first pair of hollow cylindrical compartments extending in opposite diametrical relation from and opening into the first sphere coaxially with the first axis for access to the first sphere and a second pair of hollow cylindrical compartments extending in opposite diametrical relation from and opening into the second sphere coaxially with the second axis for access to the second sphere, a pair of opposite diametrical holes formed through the third sphere, and the second pair of hollow cylindrical compartments passing through the holes of the third sphere.

3. An amphibious vehicle as claimed in claim 1, further comprising a tire type tread diametrically affixed around the third sphere and a tire type rim diametrically affixed around the first sphere.

4. An amphibious vehicle as claimed in claim 1, wherein the power means includes an axle coaxial with the first axis, and rotatably mounted in the first sphere, motor means mounted on the axle and coupling means coupling the motor means to the first sphere.

5. An amphibious vehicle as claimed in claim 1, further comprising roller means mounting the third sphere on the second sphere for rotation thereabout around the second axis.

* * * * *